US011897246B2

(12) United States Patent
Ha (10) Patent No.: US 11,897,246 B2
(45) Date of Patent: Feb. 13, 2024

(54) HEAT INSULATION MATERIAL COMPRISING AEROGEL GRANULES AND MANUFACTURING METHOD THEREFOR

(71) Applicant: Sangsun Ha, Incheon (KR)

(72) Inventor: Sangsun Ha, Incheon (KR)

( * ) Notice: Subject to any disclaimer, the term of this patent is extended or adjusted under 35 U.S.C. 154(b) by 0 days.

(21) Appl. No.: 17/774,760

(22) PCT Filed: Nov. 6, 2020

(86) PCT No.: PCT/KR2020/015484
§ 371 (c)(1),
(2) Date: May 5, 2022

(87) PCT Pub. No.: WO2021/091291
PCT Pub. Date: May 14, 2021

(65) Prior Publication Data
US 2022/0347967 A1    Nov. 3, 2022

(30) Foreign Application Priority Data
Nov. 7, 2019   (KR) .................. 10-2019-0141871

(51) Int. Cl.
| B32B 5/26 | (2006.01) |
| B32B 5/02 | (2006.01) |
| B32B 7/12 | (2006.01) |
| B32B 27/08 | (2006.01) |
| B32B 27/40 | (2006.01) |

(52) U.S. Cl.
CPC .............. *B32B 5/266* (2021.05); *B32B 5/022* (2013.01); *B32B 7/12* (2013.01); *B32B 27/08* (2013.01);
(Continued)

(58) Field of Classification Search
CPC .... B32B 5/30; B32B 5/18; B32B 7/12; B32B 2264/10; B32B 2264/203; B32B 2264/303; B32B 2266/126
See application file for complete search history.

(56) References Cited

U.S. PATENT DOCUMENTS

2003/0003284 A1* 1/2003 Schwertfeger ............ B32B 5/22
428/297.4
2009/0082479 A1    3/2009 Cho et al.
(Continued)

FOREIGN PATENT DOCUMENTS

| EP | 3281968 A1 | 2/2018 |
| EP | 3587373 A1 | 1/2020 |
(Continued)

OTHER PUBLICATIONS

Translation of WO 97/10188 A1, Frank et al., Mar. 20, 1997.*
International Search Report in International Application No. PCT/KR2020/015484, dated Feb. 17, 2021.

*Primary Examiner* — Hai Vo
(74) *Attorney, Agent, or Firm* — Raphael Bellum PLLC (57) ABSTRACT

The technique set forth in the present specification provides a heat insulation material having functions of enhancing heat-insulating performance and preventing aerogel dispersion by using aerogel granules and a polymer binder. According to an embodiment of the technique set forth in the present specification, the thickness of the heat insulation material is adjustable according to the purpose of the heat insulation material, so that a heat insulation material that can be made into products in various fields is provided.

4 Claims, 5 Drawing Sheets

(52) U.S. Cl.
    CPC .......... *B32B 27/40* (2013.01); *B32B 2250/40* (2013.01); *B32B 2255/10* (2013.01); *B32B 2255/26* (2013.01); *B32B 2255/28* (2013.01); *B32B 2274/00* (2013.01); *B32B 2307/302* (2013.01); *B32B 2307/304* (2013.01)

(56) References Cited

U.S. PATENT DOCUMENTS

| | | | | |
|---|---|---|---|---|
| 2012/0142240 A1* | 6/2012 | Eling | ................ | C08G 18/10 |
| | | | | 977/773 |
| 2014/0287641 A1* | 9/2014 | Steiner, III | ............ | F41H 5/0471 |
| | | | | 428/317.1 |
| 2015/0225630 A1* | 8/2015 | Hosoi | .................. | C04B 20/126 |
| | | | | 427/212 |

FOREIGN PATENT DOCUMENTS

| | | | | | |
|---|---|---|---|---|---|
| JP | 2009073731 | A | 4/2009 | | |
| JP | 2013525836 | A | 6/2013 | | |
| JP | 2019095046 | A | 6/2019 | | |
| KR | 1020090030635 | A | 3/2009 | | |
| KR | 1020140046543 | A | 4/2014 | | |
| KR | 1020160083160 | A | 7/2016 | | |
| KR | 1020160120202 | A | 10/2016 | | |
| KR | 1020190121284 | A | 10/2019 | | |
| KR | 102123393 | B1 | 6/2020 | | |
| WO | WO-9710188 | A1 * | 3/1997 | .............. | B32B 5/02 |
| WO | 2011130718 | A2 | 10/2011 | | |

\* cited by examiner

HEAT INSULATION MATERIAL COMPRISING AEROGEL GRANULES AND MANUFACTURING METHOD THEREFOR

FIELD OF THE DISCLOSURE

The technology disclosed herein relates to a heat insulation material comprising aerogel granules and a method for manufacturing the same, and more specifically, to a heat insulation material, which has functions of enhancing heat-insulating performance and preventing aerogel dispersion, comprising aerogel granules and a polymer binder, and a method for manufacturing the same.

BACKGROUND

Aerogel materials are super-porous materials having a porosity of 90% or higher and a pore size in the range of 1 to 100 nm, and are materials attracting attention as next-generation heat insulation materials as they are in particular several times better in the heat-insulating performance than conventional materials.

Recently, as applied research using aerogel materials has been actively conducted in the fields of heat-insulating nonwoven fabrics and films, there is an emerging need to supply aerogel heat insulation materials stably and continuously in order to secure continuity, precision, etc.

In general, aerogel materials are produced in the form of an aerogel powder such as an aerogel blanket, an aerogel sheet, or the like. The aerogel blanket has the advantages of superior heat resistance and heat insulation to polystyrene or polyurethane, which are the conventional polymer heat insulation materials.

However, the aerogel blanket is difficult to handle due to scattering resulting from a small particle size in the range of several tens of nm to several hundreds of μm and a low specific gravity, and thus has a problem of severe pollution in the working environment. In addition, there is an issue of being difficult to productize it because its mechanical strength is quite low due to the very high porosity.

SUMMARY

Technical Objects

According to one embodiment of the technology disclosed herein, there is provided a heat insulation material comprising aerogel granules and a polymer binder.

According to one embodiment of the technology disclosed herein, there is provided a heat insulation material that can be productized in various ways according to the use of the heat insulation material.

The heat insulation material in accordance with one embodiment of the technology disclosed herein provides a heat insulation material having functions of enhancing heat-insulating performance and preventing aerogel dispersion.

The technical objects to be achieved by the heat insulation material in accordance with the technical idea of the technology disclosed herein are not limited to the objects mentioned above, and other objects that have not been mentioned will be clearly understood by those skilled in the art from the following description.

Technical Solution

A heat insulation material in accordance with one embodiment of the technology disclosed herein may comprise: a first substrate layer; and a second substrate layer stacked on the first substrate layer and comprising aerogel granules, wherein the second substrate layer may comprise at least in part a polymer binder.

The polymer binder may adhere to the aerogel granules by static electricity.

The second substrate layer may be configured to be sandwiched between two of the first substrate layers.

An adhesive film layer may be further included on one or both sides of the second substrate layer.

The second substrate layer and the adhesive film layer may have a composite layer structure in which two or more are stacked.

The thickness of the heat insulation material may be in the range of 2 T to 10 T, which may be used as a heat insulation material for a blanket.

The sizes of the aerogel granules may be configured to be different from one another, which may be used as a heat insulation material for a blanket or a thin plate.

The thickness of the heat insulation material may be in the range of 0.5 T to 10 T, which may be used as a heat insulation material for a blanket or a thin plate.

An adhesive film layer to be stacked on the first substrate layer may be further included, which may be used as a heat insulation material for a thin plate.

The thickness of the heat insulation material may be in the range of 0.05 T to 0.5 T, which may be used as a heat insulation material for a thin plate.

A method of manufacturing a heat insulation material in accordance with one embodiment of the technology disclosed herein may comprise: a step of supplying a first substrate layer; a step of arranging a honeycomb structure on the first substrate layer; a step of applying a second substrate layer comprising aerogel granules and a polymer binder onto the honeycomb structure arranged on the first substrate layer; a step of stacking the first substrate layer on the second substrate layer, after removing the honeycomb structure; and a press step of applying predetermined temperature and pressure to the surface of the stacked laminate.

A step of coating an adhesive film layer may be further included, after the step of applying, and the step of applying and the step of coating may be repeated.

The press step may comprise: a first heating step of melting the adhesive film layer; and a second heating step of melting the polymer binder.

A method of manufacturing a heat insulation material in accordance with one embodiment of the technology disclosed herein may comprise: a step of supplying a first substrate layer; a step of coating an adhesive film layer on the first substrate layer; a step of applying a second substrate layer comprising aerogel granules and a polymer binder onto the adhesive film layer coated on the first substrate layer; a step of stacking the first substrate layer on the second substrate layer; and a rolling step of applying predetermined temperature and pressure to a surface of a stacked laminate.

The first substrate layer may comprise one or more selected from the group consisting of thermoplastic polyurethane (TPU), membranes, and fabrics.

Effects

The heat insulation material in accordance with one embodiment of the technology disclosed herein has advantages of enhanced heat-insulating performance, the convenience of work, prevention of aerogel detachment, the safety of work, and the like.

In addition, the method of manufacturing a heat insulation material in accordance with one embodiment of the technology disclosed herein can manufacture a heat insulation material by adjusting its thickness according to the use of the heat insulation material, and has the advantage of being usable in various fields without being limited to industrial use.

On the other hand, the effects that can be achieved by the heat insulation material and the method for manufacturing the same in accordance with one embodiment of the technology disclosed herein are illustrative examples that are not limited to those mentioned above, and other effects that are not mentioned herein will be clearly understood by those skilled in the art from the following description.

BRIEF DESCRIPTION OF THE DRAWINGS

A brief description of each drawing is provided in order to more fully understand the drawings cited herein.

DETAILED DESCRIPTION OF THE PREFERRED EMBODIMENTS

As the technology and techniques disclosed herein may be changed in various ways and may have several embodiments, particular embodiments will be illustrated in the drawings and will be described in detail through the detailed description thereof. However, this is not intended to limit the technology and techniques disclosed herein to particular embodiments, and it is to be understood that the technology and techniques disclosed herein include all changes, equivalents, and substitutes that fall within the spirit and scope of the technology and techniques disclosed herein.

In describing the technology and techniques disclosed herein, if it is determined that a specific description of related known technology and techniques may unnecessarily obscure the subject matter of the technology and techniques disclosed herein, a detailed description thereof will be omitted. In addition, the numerals (e.g., first, second, etc.) used in the description of the present specification are merely identification symbols for distinguishing one component from another.

In addition, when a member is said to be located "on" another member in the present specification, this includes not only a case in which that member is in contact with said another member but also a case in which yet another member is present between the two members.

Further, when a part is said to "include" a component in the present specification, this does not mean to exclude other components but means the possibility of further including other components, unless otherwise stated.

Moreover, as used herein, the term "a step of (~ing)" or "a step of ~" does not mean "a step for ~."

Such expressions as "first," "second," "$1^{st}$," "$2^{nd}$," or the like used in various embodiments may modify various components regardless of the order and/or importance thereof, and do not limit the corresponding components. For example, a first component may be named as a second component, and similarly, a second component may also be renamed to a first component, without departing from the scope of the technology and techniques disclosed herein.

Hereinafter, embodiments of the technology disclosed herein will be described in detail one after another.

Figure 1:
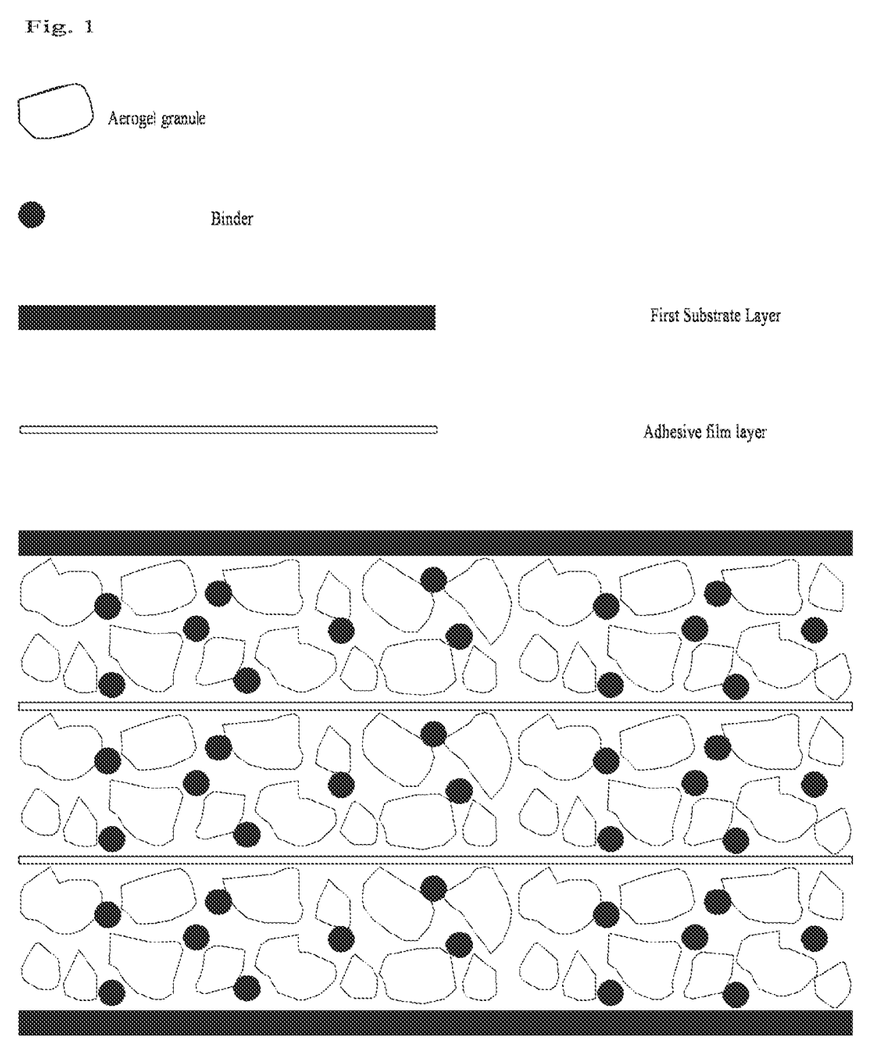
FIG. 1 is a view showing the configuration of a heat insulation material for a blanket in accordance with one embodiment of the technology disclosed herein.
Figure 2:
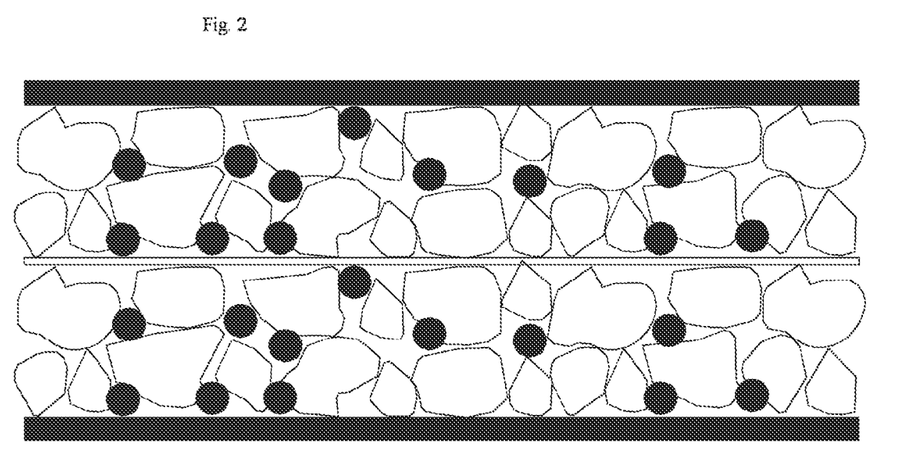
FIG. 2 is a view showing the configuration of a heat insulation material for a blanket or thin plate in accordance with one embodiment of the technology disclosed herein.
Figure 3:
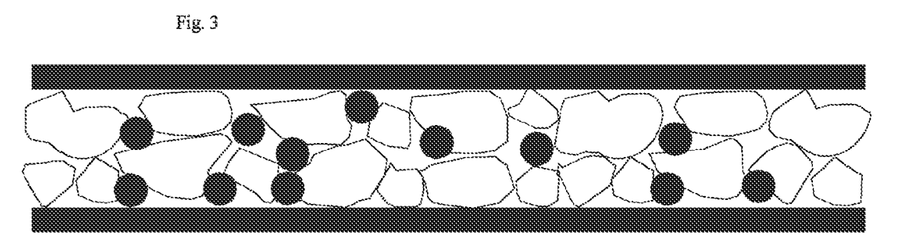
FIG. 3 is a view showing the configuration of a heat insulation material for a thin plate in accordance with one embodiment of the technology disclosed herein.

FIG. 1 is a view showing the configuration of a heat insulation material for a blanket in accordance with one embodiment of the technology disclosed herein, FIG. 2 is a view showing the configuration of a heat insulation material for a blanket or thin plate in accordance with one embodiment of the technology disclosed herein, FIG. 3 is a view showing the configuration of a heat insulation material for a thin plate in accordance with one embodiment of the technology disclosed herein, and FIG. 4 is an electron microscope measurement photograph of a heat insulation material in accordance with one embodiment of the technology disclosed herein.

A heat insulation material in accordance with one embodiment of the technology disclosed herein is a laminate of a first substrate layer and a second substrate layer.

The first substrate layer is a layer constructed on the outermost side of the heat insulation material, and may completely enclose the second substrate layer. The first substrate layer may include, but is not limited to, thermoplastic polyurethane (TPU), a membrane, a fabric, or a nonwoven fabric, and may be appropriately selected according to the purpose of use of the heat insulation material.

In one embodiment, if the heat insulation material is used for a blanket or thin plate having a thickness of 0.5 T to 10 T, the first substrate layer preferably includes one or more selected from the group consisting of thermoplastic polyurethane (TPU), membranes, fabrics, and nonwoven fabrics. Further, if the heat insulation material is used for a thin plate having a thickness of 0.05 T to 0.5 T, the first substrate layer preferably includes one or more selected from the group consisting of thermoplastic polyurethane (TPU), a membrane, and a fabric as they are facile for continuous work in the roller-type manufacturing process. Nonwoven fabrics are used for blankets, which can be used for industrial or current shoe insoles, water bottles, etc., and if a TPU film is used, there may be provided a translucent heat insulation material, which may thus be used as blinds for interior windows, resulting in an excellent effect in saving energy in a building. Furthermore, membranes or fabrics can be used for clothing.

The second substrate layer is a layer that can be stacked on the first substrate layer, and includes aerogel granules. The aerogel granules have a particle size of 0.5 to 3 mm, and are characterized by having a specific surface area of 700~1000 m²/g, a thermal conductivity of 0.01~0.03 W/m·K, a bulk density of 0.05~0.1 g/cm³, a dielectric constant of 1.1~2.0, and a porosity of 90% or higher, and have a considerably low thermal conductivity, i.e., a high heat insulation effect due to such a porous structure. Heat insulation is an important aspect if it is intended to reduce energy consumption.

In one embodiment, the bulk density of the aerogel granules is preferably 50% or more of the total volume of the heat insulation material, and 90% or more of the total volume of the second substrate layer. However, even if lower than that, they have lower heat-insulating performance but can still be used as a heat insulation material. The heat-insulating performance of the heat insulation material may be determined by the bulk density of the aerogel granules.

The sizes of the aerogel granules included in the second substrate layer may be uniform or different from one another. If the sizes of the aerogel granules are different from one another, since they are more densely arranged, the heat-insulating performance of the heat insulation material can be improved. For the heat insulation material, if the sizes of the aerogel granules are different from one another, it can be used for a blanket or a thin plate.

The second substrate layer includes at least in part a polymer binder. The polymer binder is in the form of an organic polymer powder having adhesive force.

In one embodiment, the polymer binder may include, but is not limited to, one or more selected from the group consisting of epoxy resins, polycarbonates (PC), polyvinyl chloride (PVC), polyethylene (PE), polypropylene (PP), polystyrene (PS), acrylate-based resins, polyamides, acrylonitrile-butadiene-styrene resins (ABS), polyamide-imides (PAI), polybenzimidazoles (PBI), polyetheramides (PEI), polyphenylene sulfide (PPS), polytetrafluoroethylene (PTFE), polyvinylidene fluoride (PVDF), polyethylene terephthalate (PET), polyoxymethylene (POM), polyether ether ketone (PEEK), polyaryletherketone (PAEK), liquid crystal polymers (LCP), polyimides (PI) and self-reinforced polyphenylene (SPR), (meth)acrylate-based polymers, urethane (meth)acrylate-based polymers, and polyurethane resins. The polymer binder may preferably include highly adhesive polyurethane (PU), polyethylene (PE), or hot melt powder.

The polymer binder contained in the second substrate layer is configured to adhere to the aerogel granules using static electricity, and is mixed with the aerogel granules in the second substrate layer.

The polymer binder enhances the adhesion between the first substrate layer and the second substrate layer, and at the same time, adheres to the aerogel granules, which have a considerably low specific gravity, and prevents the aerogel granules from being blown into the air during the manufacturing process, thereby making it possible to increase production efficiency and improve the working environment.

Therefore, the heat insulation material of the aerogel granules containing the polymer binder can not only enhance the adhesion between the aerogel granules and the adhesion between the aerogel granules and the substrate layer as compared with the heat insulation materials of conventional aerogel granules, but also prevent dust from being blown off in the aerogel product manufacturing process.

In one embodiment, an adhesive film layer may be further included on one or both sides of the second substrate layer. If the adhesive film layer is included, the second substrate layer may be stacked in two or more layers. If the second substrate layer is stacked in two or more layers, the heat insulation material may be used for a blanket having a thickness of 2 T or more. The thickness of the heat insulation material for the blanket may preferably be 2 T to 10 T.

The adhesive film layer is preferably a hot melt film for enhancing the adhesive force, and may be melted away by heat and pressure during the manufacturing process.

In one embodiment, the adhesive film layer may include, but is not limited to, one or more selected from the group consisting of polyolefins, thermoplastic elastomers (TPE), polyethylene terephthalate (PET), polyethylene (PE), and polyamides.

In one embodiment, the ratio of the first substrate layer: the aerogel granules:the polymer binder and the adhesive film layer may be (3 to 25)%:(50 to 90)%:(5 to 30)% by weight (wt %). The higher the weight ratio of the aerogel granules, the better the heat-insulating performance of the heat insulation material can be.

If the content of the polymer binder and the adhesive film layer is less than 5 wt %, the binding force to fasten the first and second substrate layers to each other may not be sufficient, and there is a drawback of being difficult to work with or process due to the high dust generation of the aerogels, and if over 30 wt %, there exists a possibility that the heat-insulating performance of the heat insulation material may deteriorate.

If the content of the first substrate layer is less than 3 wt %, it may be difficult to secure the strength of the heat insulation material at an appropriate level, and if over 25 wt %, there is a risk that the heat-insulating performance of the heat insulation material may deteriorate.

Figure 5:
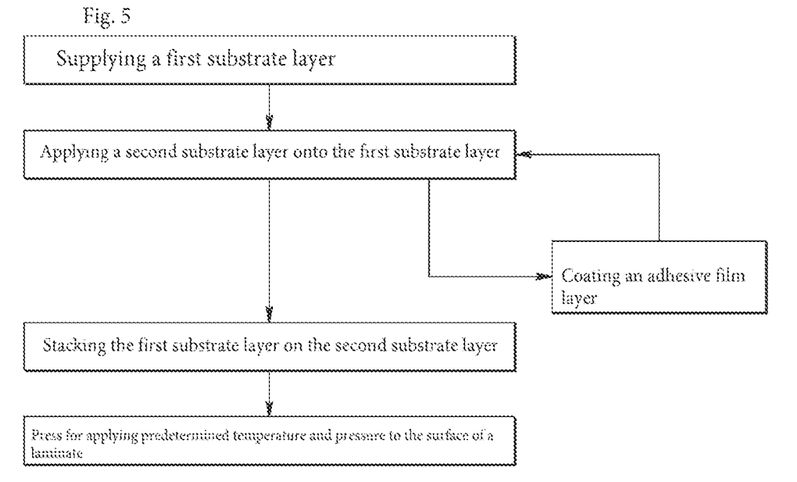
FIG. 5 is a flow diagram showing a method for manufacturing a heat insulation material in accordance with one embodiment of the technology disclosed herein.
Figure 6:
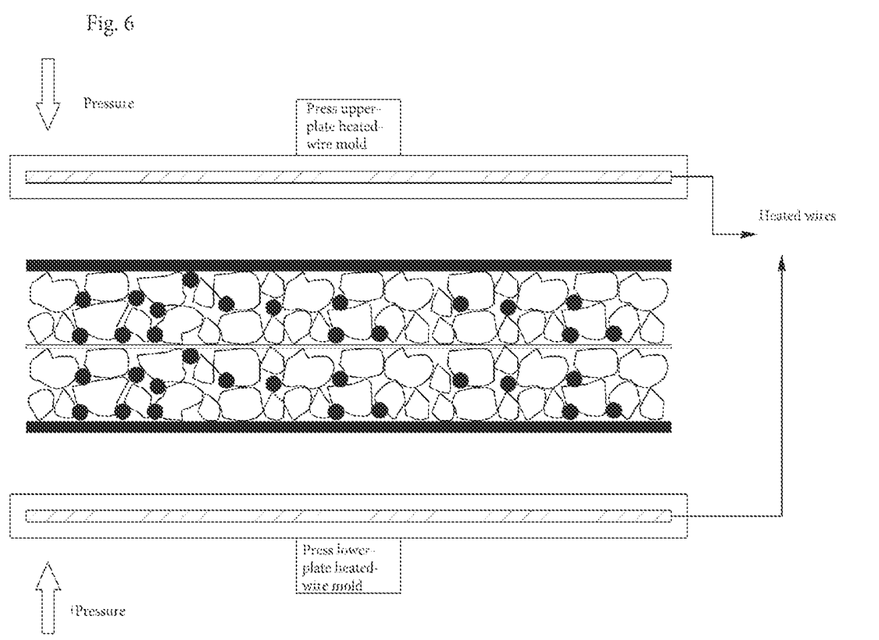
FIG. 6 is a view showing a method of manufacturing a heat insulation material in accordance with one embodiment of the technology disclosed herein.

Referring to FIGS. 5 to 6, a method of manufacturing a heat insulation material in accordance with one embodiment of the technology disclosed herein may include: a supply step S100 of supplying a first substrate layer; an arrangement step S200 of arranging a structure on the first substrate layer; an application step S300 of applying a second substrate layer comprising aerogel granules and a polymer binder onto the structure arranged on the first substrate layer; a coating step S400 of coating an adhesive film layer; a stacking step S500 of stacking the first substrate layer on the second substrate layer, after removing the honeycomb structure; and a press step S600 of applying predetermined temperature and pressure to the surface of a stacked laminate by a press molding method.

Supply Step S100

The supply step S100 of supplying the first substrate layer is a process of supplying the first substrate layer, and is arranged to supply the first substrate layer using a supply device such as rollers.

At this time, a roll of nonwoven fabric wound in circles is cut into about 1 m×1 m in width and length and supplied.

Arrangement Step S200

A structure arrangement step may be included in order to uniformly stack the second substrate layer on the first substrate layer. A honeycomb structure may be used in the arrangement step.

The thickness of the second substrate layer may be adjusted to 1 T to 3 T according to the thickness of the honeycomb structure, and the thickness of the entire heat insulation material may be formed to 0.05 to 10 T. If the thickness of the heat insulation material is less than 0.05 T, there is a problem that the heat-insulating performance deteriorates, and if over 10T, there is an issue that the air flow is excessively blocked.

Application Step S300

This is a step of uniformly applying the second substrate layer comprising the aerogel granules and the polymer binder onto the honeycomb structure arranged on the first substrate layer.

The aerogel granules and the polymer binder are housed in an applicator in the state of a mixture in which they are mixed in a predetermined ratio, and the mixture may be dispersed onto the surface of the first substrate layer while the distribution rollers provided on the discharge port side of the applicator rotate at a constant speed.

Here, the polymer binder may include one or more selected from the group consisting of epoxy resins, polycarbonates (PC), polyvinyl chloride (PVC), polyethylene (PE), polypropylene (PP), polystyrene (PS), acrylate-based resins, polyamides, acrylonitrile-butadiene-styrene resins (ABS), polyamide-imides (PAI), polybenzimidazoles (PBI), polyetheramides (PEI), polyphenylene sulfide (PPS), polytetrafluoroethylene (PTFE), polyvinylidene fluoride (PVDF), polyethylene terephthalate (PET), polyoxymethylene (POM), polyether ether ketone (PEEK), polyaryletherketone (PAEK), liquid crystal polymers (LCP), polyimides (PI) and self-reinforced polyphenylene (SPR), (meth)acrylate-based polymers, urethane (meth)acrylate-based polymers, and polyurethane resins.

Coating Step S400

The coating step S400 of coating the adhesive film layer onto the second substrate layer sprayed uniformly on the surface of the first substrate layer may further be included, and the application step S300 and the coating step (S400) may be performed in a repetitive process.

As a method of forming the adhesive film layer on the second substrate layer, it may be formed by spin coating, bar coating, spray coating, or an inkjet printing method, but is not necessarily limited thereto.

Here, the adhesive film layer may be a hot melt film comprising one or more selected from the group consisting of polyolefins, thermoplastic elastomers (TPE), polyethylene terephthalate (PET), polyethylene (PE), and polyamides.

Stacking Step S500

After removing the honeycomb structure, the first substrate layer may be stacked on the second substrate layer. The first substrate layer to be stacked here may have the same or different configuration from the first substrate layer supplied in the supply step S100.

The first substrate layer may include one or more selected from the group consisting of thermoplastic polyurethane (TPU), membranes, fabrics, and nonwoven fabrics.

Press Step S600

The press step S600 of placing the stacked laminate on a press and applying predetermined temperature and pressure to the surface of the stacked laminate, by the press molding method, is included.

Here, a first heating step S610 of pressing the laminate including the adhesive film layer at a temperature of 80 to 120° C. and a pressure of 50 to 60 kgf/cm² until the adhesive film layer melts away may be included.

Subsequently, a second heating step S620 of pressing the laminate including the polymer binder at a temperature of 80 to 170° C. and a pressure of 50 to 60 kgf/cm² until the polymer binder melts away may be included. Here, the temperature may be adjusted to 150 to 170° C. if the polymer binder is polyurethane (PU) powder, 105 to 110° C. for polyethylene (PE) powder, and 80 to 100° C. for hot melt powder.

Cooling Step S700

The method of manufacturing a heat insulation material in accordance with one embodiment of the technology disclosed herein may further include a cooling step S700, after said S100 to S600. The cooling step S700 is for cooling the laminate that has undergone the press step S600, and is a process of cooling the laminate that is mutually closely joined through heat fusion.

Here, by gradually releasing the applied pressure as well, it is possible to prevent the formation of bubbles, distortion, or the like of the adhesive.

Thereafter, in the method of manufacturing a heat insulation material in accordance with one embodiment of the technology disclosed herein, a drying step may further be performed. The drying process may be implemented by an atmospheric drying or supercritical drying process.

The atmospheric drying process is simple and economical in terms of a process as it does not require high-pressure reaction conditions, special high-pressure equipment for supercritical drying, and the like, but as the water or the organic solvent evaporates at a high temperature, the internal pore structure of the heat insulation material may collapse compared to supercritical drying, and thus there may be a problem that the heat-insulating performance deteriorates sharply. Further, the above problem may be further exacerbated if dried directly without substitution with an organic solvent having a low surface tension.

In contrast, supercritical drying can maximize the porosity, and thus be significantly superior in heat-insulating performance to the heat insulation material by atmospheric drying.

Figure 7:
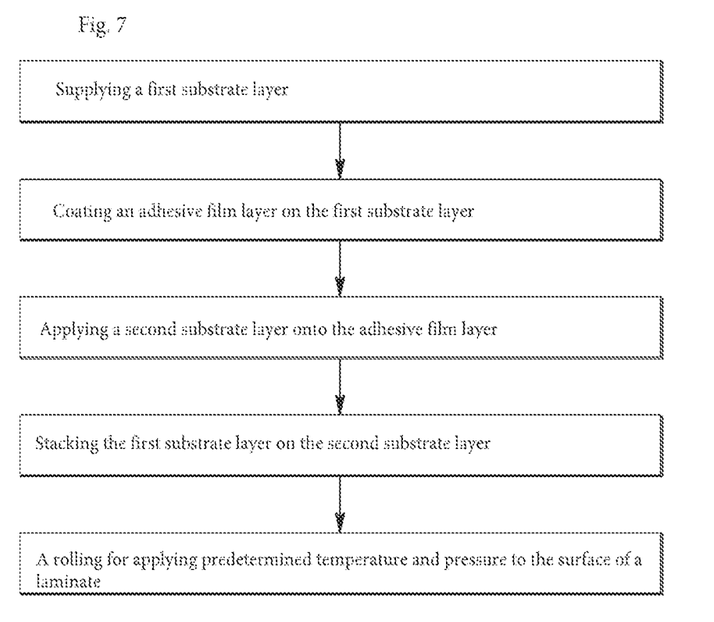
FIG. 7 is a flow diagram showing a method of manufacturing a heat insulation material in accordance with one embodiment of the technology disclosed herein.
Figure 8:
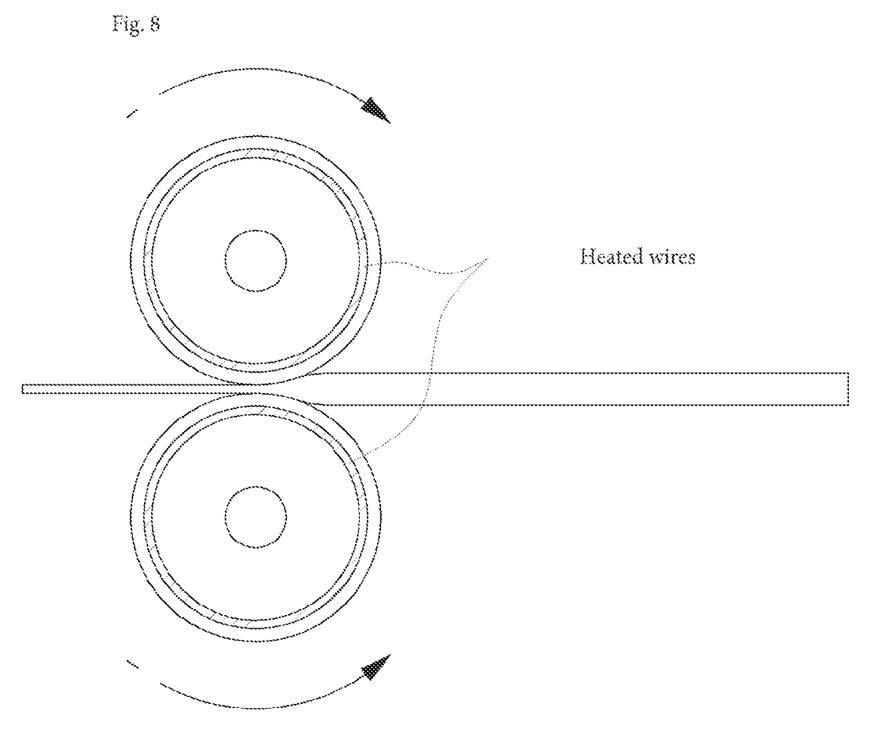
FIG. 8 is a view showing a method of manufacturing a heat insulation material in accordance with one embodiment of the technology disclosed herein.

Referring to FIGS. 7 to 8, a method of manufacturing a heat insulation material in accordance with one embodiment of the technology disclosed herein may include: a supply step S110 of supplying a first substrate layer; a coating step S210 of coating an adhesive film layer on the first substrate layer; an application step S310 of applying a second substrate layer comprising aerogel granules and a polymer binder onto the adhesive film layer coated on the first substrate layer by using a spray gun; a stacking step S410 of stacking the first substrate layer on the second substrate layer; and a rolling step S510 of applying predetermined temperature and pressure to the surface of a stacked laminate by a roller method.

Supply Step S110

The supply step S110 of supplying the first substrate layer is a process of supplying the first substrate layer, and is arranged to supply the first substrate layer using a supply device such as rollers.

Coating Step S210

This is a step of coating the adhesive film layer on the first substrate layer, and as a method of forming the adhesive film layer on the first substrate layer, it may be formed by spin coating, bar coating, spray coating, or an inkjet printing method, but is not necessarily limited thereto.

Here, the adhesive film layer may be a hot melt film comprising one or more selected from the group consisting of polyolefins, thermoplastic elastomers (TPE), polyethylene terephthalate (PET), polyethylene (PE), and polyamides.

Application Step S310

The second substrate layer comprising the aerogel granules and the polymer binder is applied onto the adhesive film layer coated on the first substrate layer by using a spray gun.

At this time, the second substrate layer may be applied continuously onto the film, which is wound in circles, coated with an adhesive by using a spray or the like.

The second substrate layer is manually sprayed onto the adhesive film layer in order from top to bottom by using a spray gun, or is sprayed side by side onto the adhesive film layer that is being conveyed by using a plurality of spray devices, to thereby apply the second substrate layer, followed by being dried and stacked.

Here, the polymer binder may include one or more selected from the group consisting of epoxy resins, polycarbonates (PC), polyvinyl chloride (PVC), polyethylene (PE), polypropylene (PP), polystyrene (PS), acrylate-based resins, polyamides, acrylonitrile-butadiene-styrene resins (ABS), polyamide-imides (PAI), polybenzimidazoles (PBI), polyetheramides (PEI), polyphenylene sulfide (PPS), polytetrafluoroethylene (PTFE), polyvinylidene fluoride (PVDF), polyethylene terephthalate (PET), polyoxymethylene (POM), polyether ether ketone (PEEK), polyaryletherketone (PAEK), liquid crystal polymers (LCP), polyimides (PI) and self-reinforced polyphenylene (SPR), (meth)acrylate-based polymers, urethane (meth)acrylate-based polymers, and polyurethane resins.

Stacking Step S410

The first substrate layer may be stacked on the second substrate layer. The first substrate layer to be stacked here may have the same or different configuration from the first substrate layer supplied in the supply step S110.

The first substrate layer preferably includes one or more selected from the group consisting of thermoplastic polyurethane (TPU), membranes, and fabrics, in which case it is facile for continuous operation.

Rolling Step S510

The rolling step S510 of applying predetermined temperature and pressure to the surface of the stacked laminate, by a roller method, is included.

The stacked laminate is placed between a pair of binding rollers, and the laminate is pressed by the binding rollers so as to produce a nonwoven fabric.

By subjecting the stacked laminate to pressure while passing through the inside of the pair of binding rollers, the impregnation property of the pressured laminate is improved, so that a uniform heat insulation material is produced.

Here, if compressed with a heat roller so that heat can be continuously applied when winding it on a roller, the adhesive film layer and the polymer binder can be melted, to thereby enhance the binding strength of the heat insulation material.

Here, the temperature of the heat roller may be adjusted to a temperature of 150 to 170° C. if the polymer binder is polyurethane (PU) powder, 105 to 110° C. for polyethylene (PE) powder, and 80 to 100° C. for hot melt powder.

The method of manufacturing a heat insulation material in accordance with one embodiment of the technology disclosed herein may further include a cooling step of the same process as said cooling step S700, after said S110 to S510.

Hereinafter, embodiments of the present disclosure and comparative examples will be described. The following embodiments are merely embodiments of the present disclosure, and the present disclosure is not limited to the following embodiments.

Embodiment 1

A nonwoven fabric with a thickness of 50 µm was prepared as a first substrate layer of a heat insulation material for a blanket.

As a second substrate layer, 95 wt % of aerogel granules having an average size of 0.5 mm, 4 wt % of polyurethane (PU) powder, and 1 wt % of an additive (surfactant) were added and then dispersed by stirring at a speed of 1000 rpm for about 30 minutes, thereby producing a second substrate layer composition.

A honeycomb structure having a thickness of 5 T was arranged on the first substrate layer, and the second substrate layer composition was uniformly applied onto the honeycomb structure having a thickness of 5 T, thereby forming a second substrate layer having a thickness of 5 T.

Polyethylene (PE) was spin-coated on the second substrate layer at 1500 rpm for 15 seconds, thereby forming an adhesive film layer.

Thereafter, a honeycomb structure having a thickness of 5 T was arranged on the adhesive film layer, and the second substrate layer composition was uniformly applied onto the honeycomb structure having a thickness of 5 T, thereby repeatedly forming a second substrate layer having a thickness of 5 T.

Next, after removing the honeycomb structure, the nonwoven fabric having a thickness of 50 µm was stacked on the second substrate layer, and then the stacked laminate was placed on a press at room temperature. At this time, the polyethylene (PE) adhesive film layer was completely melted away in the laminate at a temperature of about 100° C. and a pressure of about 80 kgf/cm². Then, the temperature was further raised to about 160° C., and thus the polyurethane (PU) polymer binder was completely melted away.

Thereafter, the laminate was cooled down by blowing low-temperature air for about 30 minutes, and then dried by subjecting to an atmospheric drying process, and thus, a heat insulation material for a blanket in accordance with Embodiment 1 was finally produced.

Embodiment 2

A heat insulation material for a blanket was produced in the same method as in Embodiment 1, but aerogel granules having different sizes were used.

Embodiment 3

As a first substrate layer of a heat insulation material for a thin plate, a thermoplastic polyurethane (TPU) film having a thickness of 10 µm was prepared.

Polyethylene (PE) was spin-coated on the first substrate layer at 1500 rpm for 15 seconds, thereby forming an adhesive film layer.

A second substrate layer was produced under the same conditions as in Embodiment 1, and the second substrate layer was sprayed onto the adhesive film layer by using a spray gun, or was sprayed side by side onto the adhesive film layer that is being conveyed by using a plurality of spray devices, to thereby apply the second substrate layer, followed by being dried at a temperature of 110° C. to 130° C. and stacked.

Then, after stacking the thermoplastic polyurethane (TPU) film having a thickness of 10 µm on the second substrate layer, the stacked laminate was placed between a pair of heat rollers, and while the laminate was heated and pressed by the heat rollers at a temperature of about 150° C. and a pressure of about 80 kgf/cm², the polyethylene (PE) adhesive film layer and the polyurethane (PU) polymer binder all melted and permeated between the aerogel granules. At this time, not only the binder but also the film may serve as an adhesive while melting and permeating between the aerogels.

Thereafter, the laminate was cooled down by blowing low-temperature air for about 30 minutes, and then dried by subjecting to an atmospheric drying process, and thus, a heat insulation material for a thin plate in accordance with Embodiment 2 was finally produced.

Comparative Example 1

A heat insulation material for a thin plate was produced under the same conditions as in Embodiment 3 above, but a second substrate layer that does not contain polyurethane (PU) powder as a polymer binder was used to produce the heat insulation material for a thin plate.

EXPERIMENTAL EXAMPLES

Morphology Comparison of Heat Insulation Materials Containing Polymer Binders

Figure 4A:
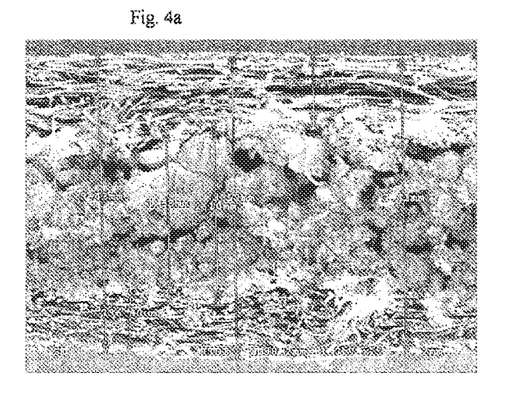
FIG. 4 is an electron microscope measurement photograph of a heat insulation material in accordance with one embodiment of the technology disclosed herein.
Figure 4B:
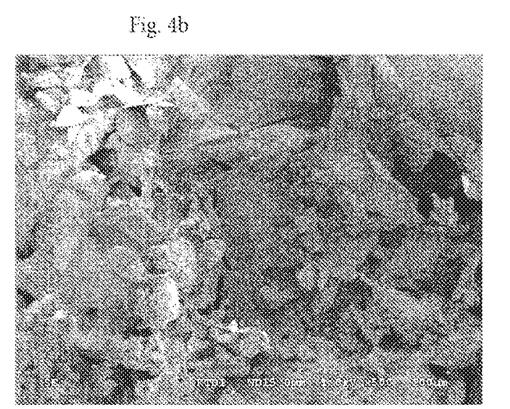

In order to observe the morphology of heat insulation materials, each of the heat insulation material samples produced according to Embodiment 1 was cut into 400 mm (width)×400 mm (length)×3.5 mm (height), and the samples were placed in liquid nitrogen and cut, and then the cross-section of the cells was measured with a scanning electron microscope (SEM). FIG. 4(a) is a cross-sectional SEM photograph of the sample produced according to Embodiment 1, and FIG. 4(b) is a close-up SEM photograph of the binding of the aerogel granules and the polymer binder according to Embodiment 1. Referring to FIG. 4(a), as a result of checking with FE-SEM measurements, it can be seen that the width of the entire heat insulation material is 3.5 mm thick. Further, it can be seen that the aerogel granules in the intermediate layer harmonize with the PU adhesive to form one heat insulation layer. It can be seen that the width of the heat insulation layer of the intermediate layer is 2.0 mm thick. Referring to FIG. 4(b), the shape of the polymer binder melted by heat and bound around the aerogel granules can be seen in the direction of the red arrows.

As described above, it was confirmed that the polymer binder was bound to the aerogel granules to form one heat insulation layer, thereby preventing dust from being blown in the manufacturing process.

Thermal Conductivity Test

In order to check the heat-insulating performance of the heat insulation material of Embodiment 1 above, the thermal conductivity was measured in accordance with ASTM C518, and the results are shown in Table 1 below.

TABLE 1

| Test items | Units | Results | Test methods |
| --- | --- | --- | --- |
| Thermal conductivity (40° C.) | W/m · K | 0.024 | ASTM C518-17 |

With reference to Table 1, it can be seen that the thermal conductivity of the embodiments comprising the polymer binder shows a lower level compared to the conventional heat insulation materials. Therefore, it is possible to reduce energy consumption by utilizing such excellent heat insulation properties, and to utilize it as heat insulation materials in various fields.

What is claimed is:

1. A heat insulation material comprising:
at least two first substrate layers; and
at least two second substrate layers stacked on at least one of the first substrate layers and comprising aerogel granules,
wherein the second substrate layers comprise at least in part a polymer binder,
the aerogel granules have a particle size of 0.5 to 3 mm,
the polymer binder adheres to the aerogel granules by static electricity,
the second substrate layers are sandwiched between two of the first substrate layers,
the heat insulation material further comprises at least one adhesive film layer on one or both sides of at least one of the second substrate layers, and
the ratio of the first substrate layers:the aerogel granules:the polymer binder and the at least one adhesive film layer is (3 to 25) %:(50 to 90) %:(5 to 30) % by weight (wt %),
wherein the at least one adhesive film layer is not adhered to the first substrate layers,
wherein the bulk density of the aerogel granules is 50% or more of the total volume of the heat insulation material, and 90% or more of the total volume of the second substrate layers, and
wherein the aerogel granules in the second substrate layers have a uniform particle size.

2. The heat insulation material of claim 1, wherein the polymer binder comprises one or more selected from the group consisting of epoxy resins, polycarbonates (PC), polyvinyl chloride (PVC), polyethylene (PE), polypropylene (PP), polystyrene (PS), acrylate-based resins, polyamides, acrylonitrile-butadiene-styrene resins (ABS), polyamide-imides (PAI), polybenzimidazoles (PBI), polyetheramides (PEI), polyphenylene sulfide (PPS), polytetrafluoroethylene (PTFE), polyvinylidene fluoride (PVDF), polyethylene terephthalate (PET), polyoxymethylene (POM), polyether ether ketone (PEEK), polyaryletherketone (PAEK), liquid crystal polymers (LCP), polyimides (PI) and self-reinforced polyphenylene (SPR), (meth)acrylate-based polymers, urethane (meth)acrylate-based polymers, and polyurethane resins.

3. The heat insulation material of claim 1, wherein the at least one adhesive film layer is a hot melt film comprising one or more selected from the group consisting of polyolefins, thermoplastic elastomers (TPE), polyethylene terephthalate (PET), polyethylene (PE), and polyamides.

4. A heat insulation material for a blanket, comprising:
a first substrate layer;
a second substrate layer stacked on the first substrate layer and comprising aerogel granules, wherein the second substrate layer comprises at least in part a polymer binder; and
an adhesive film layer formed on one or both sides of the second substrate layer,
wherein the aerogel granules have a particle size of 0.5 to 3 mm,
the polymer binder adheres to the aerogel granules by static electricity,
the heat insulation material for a blanket has a composite layer structure in which two or more assemblies of the second substrate layer and the adhesive film layer are stacked,
the heat insulation material for a blanket has a thickness (T) of 2 mm (T) to 10 mm (T), and
the ratio of the first substrate layer:the aerogel granules:the polymer binder and the adhesive film layer is (3 to 25) %:(50 to 90) %:(5 to 30) % by weight (wt %),
wherein the second substrate layer is stacked in two or more layers, wherein the bulk density of the aerogel granules is 50% or more of the total volume of the heat insulation material, and 90% or more of the total volume of the second substrate layers, and wherein the aerogel granules in the second substrate layers have a uniform particle size.

\* \* \* \* \*